United States Patent [19]

Bartholomew

[11] Patent Number: 4,778,203
[45] Date of Patent: Oct. 18, 1988

[54] SWIVELABLE QUICK CONNECTOR FOR HIGH TEMPERATURE CONNECTION

[75] Inventor: Donald D. Bartholomew, Marine City, Mich.

[73] Assignee: Proprietary Technology, Inc., Southfield, Mich.

[21] Appl. No.: 913,592

[22] Filed: Oct. 1, 1986

Related U.S. Application Data

[63] Continuation of Ser. No. 770,197, Aug. 28, 1985, abandoned, which is a continuation-in-part of Ser. No. 360,201, Mar. 22, 1982, Pat. No. 4,601,497.

[51] Int. Cl.$^4$ ................................ F16L 17/02
[52] U.S. Cl. ........................ 285/111; 285/187; 285/319; 285/281; 285/917; 285/921
[58] Field of Search ............ 285/319, 281, 111, 917, 285/321, 924, 921, 187

[56] References Cited

U.S. PATENT DOCUMENTS

| 921,691 | 5/1909 | Friday . | |
|---|---|---|---|
| 1,542,421 | 6/1925 | Strongson . | |
| 2,123,889 | 7/1938 | Gleason . | |
| 2,441,344 | 5/1948 | Bosworth . | |
| 2,585,887 | 2/1952 | Woodward . | |
| 2,638,362 | 5/1953 | Sherman et al. | 285/111 X |
| 2,878,041 | 3/1959 | Hobbs | 285/187 X |
| 3,046,026 | 7/1962 | Burrows | 277/205 X |
| 3,142,881 | 7/1964 | Press | 285/917 X |
| 3,279,806 | 10/1966 | Bialkowski | 277/205 |
| 3,314,696 | 4/1967 | Ferguson et al. . | |
| 3,378,269 | 4/1968 | Castor | 277/205 |
| 3,450,424 | 6/1969 | Calisher . | |
| 3,453,005 | 7/1969 | Foults . | |
| 3,534,988 | 10/1970 | Lindsey | 285/305 |
| 3,538,940 | 11/1970 | Graham . | |
| 3,569,903 | 3/1971 | Brishka . | |
| 3,574,359 | 4/1971 | Klein . | |
| 3,584,902 | 6/1971 | Vyse | 285/305 |
| 3,711,125 | 1/1973 | Dehar | 285/319 X |
| 3,718,350 | 2/1973 | Klein | 285/321 X |
| 3,724,882 | 4/1973 | Dehar | 285/243 |
| 3,826,523 | 7/1974 | Eschbaugh | 285/319 X |
| 3,929,356 | 12/1975 | DeVincent et al. | 285/305 |
| 3,929,357 | 12/1975 | DeVincent et al. | 285/319 |
| 3,980,324 | 9/1976 | Bouteille et al. | 285/281 X |
| 4,005,881 | 2/1977 | Burton et al. | 285/917 X |
| 4,005,883 | 2/1977 | Guest | 285/322 |
| 4,009,896 | 3/1977 | Brewer | 285/305 |
| 4,080,752 | 3/1978 | Burge | 285/321 X |
| 4,111,464 | 9/1978 | Asano et al. | 285/321 X |
| 4,123,089 | 10/1978 | Viero et al. | 285/39 |
| 4,123,091 | 10/1978 | Cosentino et al. | 285/39 |
| 4,128,264 | 12/1978 | Oldford | 285/319 X |
| 4,135,745 | 1/1979 | Dehar | 285/319 |
| 4,214,586 | 7/1980 | Mericle | 285/370 |
| 4,266,814 | 5/1981 | Gallagher | 285/319 |
| 4,421,325 | 12/1983 | Napolitano | 285/187 X |

FOREIGN PATENT DOCUMENTS

| 1084987 | 7/1960 | Fed. Rep. of Germany | 285/111 |
|---|---|---|---|
| 2307154 | 8/1974 | Fed. Rep. of Germany . | |
| 2611233 | 9/1977 | Fed. Rep. of Germany . | |
| 2622269 | 11/1977 | Fed. Rep. of Germany . | |
| 1305096 | 8/1962 | France | 285/321 |

*Primary Examiner*—Thomas F. Callaghan
*Attorney, Agent, or Firm*—Harness, Dickey & Pierce

[57] ABSTRACT

A swivelable quick connect assembly for transferring of high-temperature, low-pressure fluids is disclosed as comprising a device having an axial bore for receiving one end of a conduit, a retaining element being demountably coupled to the device in the axial bore, the retaining element having a securing portion for securely fastening the conduit in the retainer element, a device engaging portion for retaining the retainer element in the axial bore of the device and the retainer having a sealing element with a concentric ring design for effecting a seal between the device and the conduit.

21 Claims, 2 Drawing Sheets

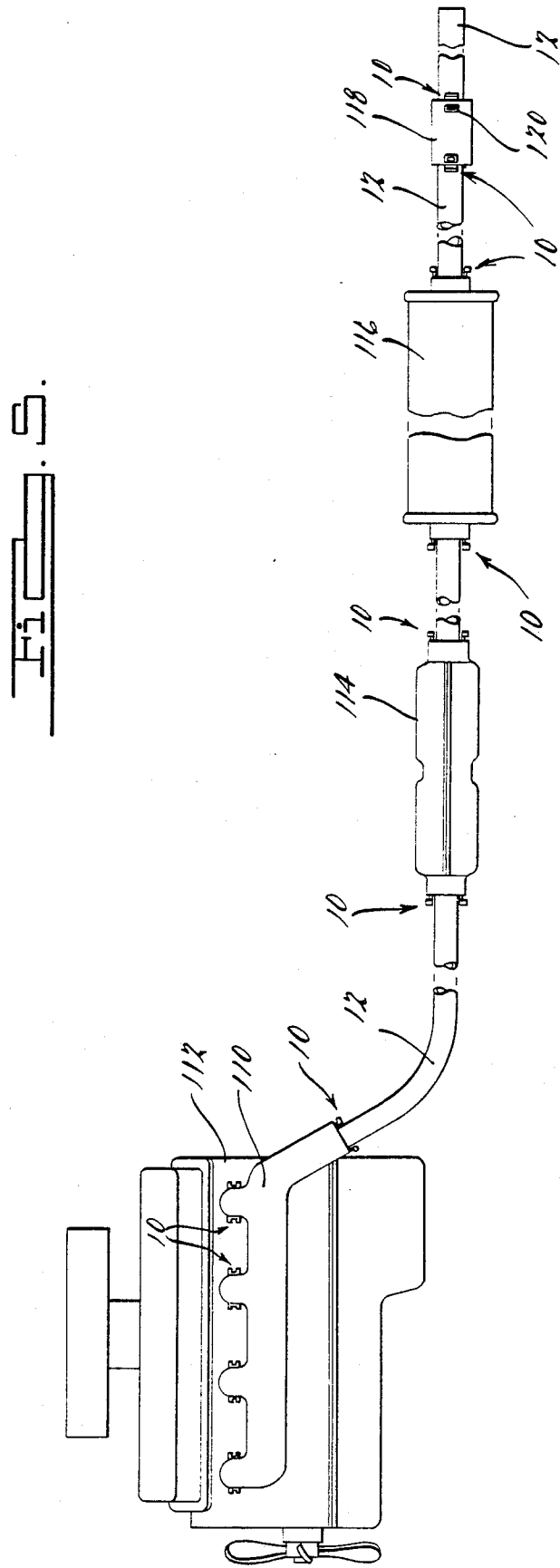

SWIVELABLE QUICK CONNECTOR FOR HIGH TEMPERATURE CONNECTION

CROSS REFERENCE TO A RELATED APPLICATION

This application is a continuation of application Ser. No. 770,197, filed Aug. 28, 1985 and now abandoned which is a continuation-in-part of application Ser. No. 360,201 filed Mar. 22, 1982, now U.S. Pat. No. 4,601,497.

BACKGROUND AND SUMMARY OF THE INVENTION

The present invention relates to a connector assembly for providing a swivelable quick connection for conveying high-temperature, low-pressure fluids in conduits. In many fields of industry, in particular the automotive industry, the need has existed for low cost, reliable and easy to assemble components for the carrying of high-temperature, low pressure fluids. This need is especially apparent in the connection of automotive exhaust components to each other and to the engine exhaust manifold. In the past, automotive exhaust components have been connected by threaded connectors, necessitating the screwing on of the connectors during the assembly process and employing the proper torque necessary to establish adequate sealing. A major drawback of these exhaust connectors is the removal of the exhaust connectors after the part is worn out. Those in the field have experienced the insurmountable task of loosening the bolts which secure the exhaust pipe to the engine manifold. The loosening of these bolts usually necessitates the expenditure of a great deal of time and effort to release the exhaust pipe from the engine manifold.

Accordingly, it is a primary objective of the present invention to provide a connector assembly for providing a swivelable quick connection between a device, such as an exhaust manifold, muffler, or the like, and a conduit conveying fluids having high-temperature, low-pressure properties.

It is an additional objective of the present invention to provide a high-temperature low-pressure connector assembly which will permit quick and simple disconnection for maintenance or replacement purposes.

It is a further objective of the present invention to provide a connector assembly which has a seal that is capable of adjusting to significant temperature changes.

It is another objective of the present invention to provide a connector assembly which eliminates the need for threaded connectors in the connection of conduits conveying high-temperature, low-pressure fluids.

To achieve the foregoing objects, the present invention provides a swivelable connector assembly which generally comprises a tubular conduit, a fixture, metallic sealing means, and retaining means. The tubular conduit is adapted to convey fluid and is formed with an annular projection disposed a predetermined distance from the end of the conduit to be connected. The fixture is formed with an axial bore for receiving the conduit at a first port and for providing a fluid path through the fixture and includes an inwardly extending annular lip at the first port to detachably secure the retaining means to the fixture. The metallic sealing means, having a cup seal design, is disposed within the axial bore of the fixture for providing a fluid tight seal between confronting portions of the conduit and the fixture. The retainer means is adapted to be disposed generally within the axial bore of the fixture for cooperating with the annular projection of the conduit to secure the conduit in its operative position within the axial bore of the fixture. The retainer means includes a plurality of circumferentially spaced resilient deformable arm members which extend from an integral collar member at one end thereof. Each of the arm members has an outwardly opening channel portion which is adapted to receive the inwardly extending lip of the fixture to secure the retainer means to the fixture and an inwardly opening channel portion adapted to receive the annular projection of the conduit for securing the conduit in its operative position within the axial bore of the fixture. The ring from which the arms extend may additionally serve to position and retain the sealing means.

Additional objects and advantages of the present invention will become apparent from a reading of the detailed description of the preferred embodiment which makes reference to the following set of drawings.

BRIEF DESCRIPTION OF THE DRAWINGS

FIG. 5 is a diagramatic view of an automotive exhaust emission system.

DETAILED DESCRIPTION OF THE PREFERRED EMBODIMENT

Figure 1:
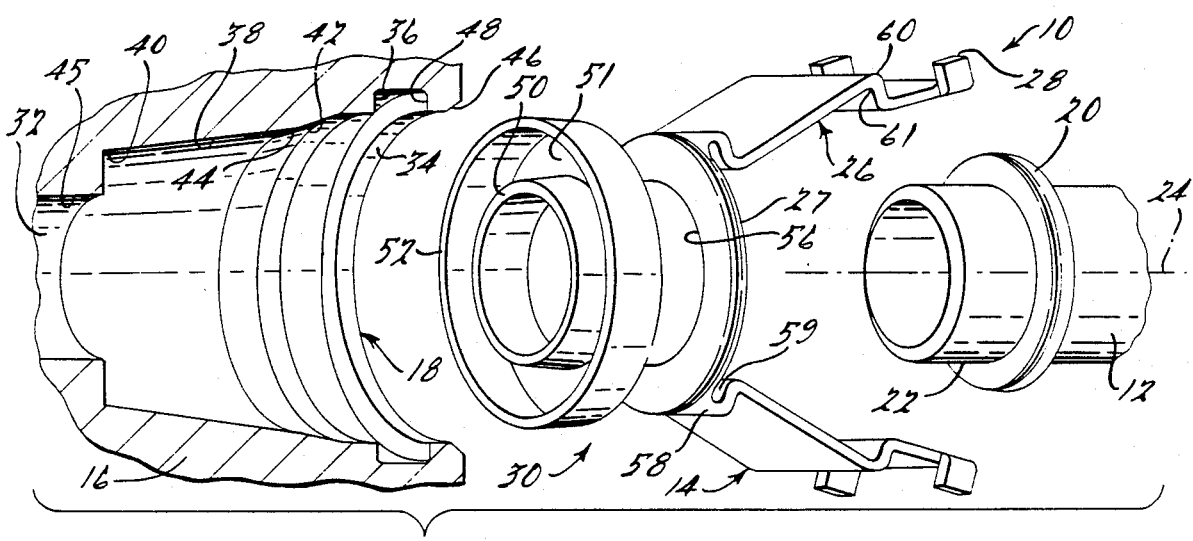
FIG. 1 is a perspective view, partially in cross-section, of a connector assembly according to the present invention.

Referring to FIG. 1, a perspective view of a connector assembly 10 according to the present invention is shown. The connector assembly 10 is generally comprised of a tubular conduit 12 adapted to convey fluid, a retainer element 14, a sealing element 30, and a fixture 16 having a port 18 which is adapted to accept the sealing element 30, retaining element 14 and the conduit 12. The conduit 12 is provided with an outwardly projecting annular surface 20 displaced from a beveled connecting end 22 of the conduit. The annular surface 20 is disposed transversely or perpendicular to the central axis 24 of the conduit 12 and provides a blocking wall to secure the conduit 12 in the retaining element 14. Retaining element 14 is manufactured from a metallic material, such as spring steel or the like, and is comprised of a plurality of resilient arms 26 which extend from a central base 27. Each of the arms 26 has a conduit securing portion 58, a fixture engaging portion 60, and a flanged stop portion 28. Sealing element 30, manufactured from a suitable metallic material, such as spring steel or the like, is preferably a cup seal.

Figures 2, 4:
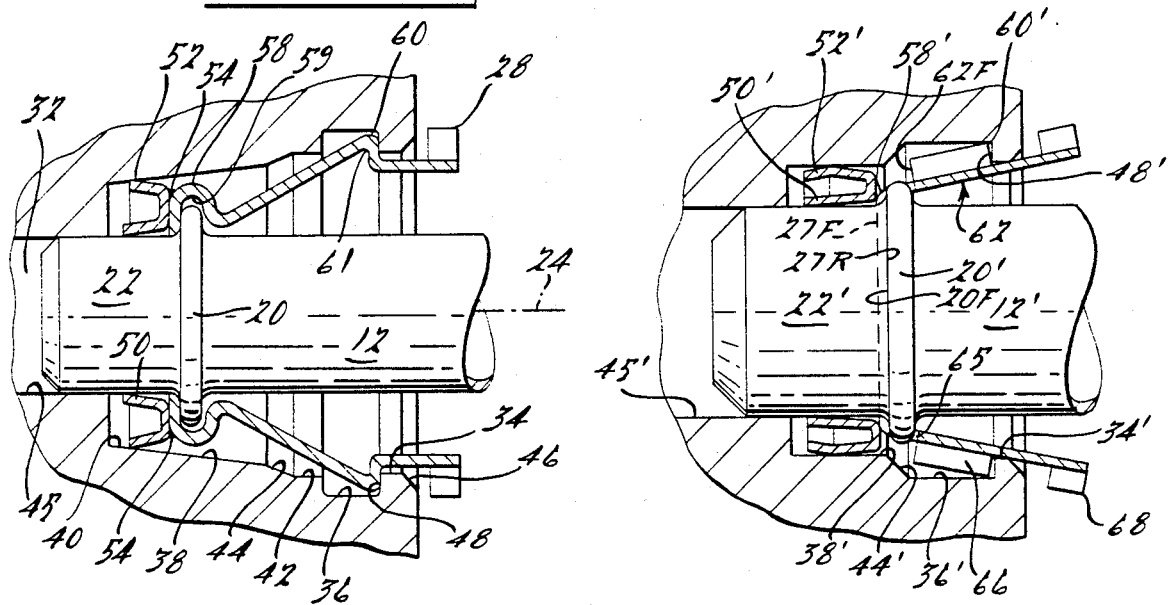
FIG. 2 is a side elevation view, partially in cross-section of the connector assembly shown in FIG. 1.
FIG. 4 is a side elevation view, partially in cross-section, of the retaining means of FIG. 3 in the connector assembly.

FIG. 2 shows a cross-sectional view of the connector assembly with the conduit 12 and the retaining element 14 inserted into the fixture 16 which is preferably an automotive engine, exhaust manifold, muffler or the like. The fixture 16 is shown to be formed with a central bore 32 having a first diameter portion 34 having a magnitude greater in diameter than that of the sealing element 30, an enlarged diameter portion 36 and a sloping third diameter portion 38 having a magnitude at its narrowest portion 40 which is suitably smaller than the diameter of the sealing element 30. The central bore 32, may also have a fourth diameter portion 42 adjacent to the enlarged diameter portion 36, and approximately equal in magnitude to that of the first diameter portion 34. The central bore 32, may also have a sloping fifth diameter portion 44, in between the third diameter portion 38 and the fourth diameter portion 42 which acts as a guide for guiding the retaining element 14 into the third diameter portion 38.

The central bore 32 may have a sixth diameter portion 45 adjacent to the third diameter portion 38 and having a magnitude slightly greater than that of the conduit. The sixth diameter portion 45 permits the disposing of the conduit 12 in the sixth diameter portion 45 minimizing the fluid flow leakage between the conduit 12 and fixture 16. The sixth diameter portion 45, is generally the pathway through the fixture 16. The central bore 32 may also have a chamfer portion 46, adjacent to the first diameter portion 34, for guiding the ingress of the retaining element 14 into port 18. The third diameter portion 38, adjacent to the enlarged diameter portion 36, slopes at an angle of about three to ten degrees with respect to the central axis 24. The sloping of the third diameter portion 38, compresses the sealing element 30 against the walls of fixture 16, in order to provide a generally fluid tight seal between the fixture 16 and the conduit 12.

The enlarged diameter portion 36 provides a radial inwardly opening channel which secures the arms 26 of the retaining element 14 in the port 18 of the fixture 16. The first diameter portion 34, somewhat smaller in diameter than the enlarged diameter portion 36, forms a front wall 48 providing a inwardly extending annular lip for retaining the arms 26 of the retaining element 14.

Sealing element 30, is preferably manufactured from U-channeled spring steel or the like, and is generally known as a cup seal, having an inner ring portion 50 as the interior of the seal, a generally flat wall portion 51 and an outer ring portion 52 as the exterior of the seal. The inner ring portion 50 slopes at an angle of about three to ten degrees, toward the central axis, with respect to the central axis 24. The outer ring portion 52 slopes at an angle of about three to ten degrees, away from the central axis, with respect to the central axis 24. The inner ring portion 50 has a diameter which is suitably smaller than the conduit 12 for receiving the conduit in the inner ring portion 50 and forming a nesting relation between the conduit 12 and the sealing element 30. The outer ring portion 52, has a diameter suitably larger than the third diameter portion 38 of the central bore 32. The sealing element 30 is compressed against the walls of fixture 16 in the third diameter portion 38 of the fixture 16 for sealing the conduit in the central bore 32.

The sealing element 30 is inserted into the fixture 16 by placing the sealing element 30 in the third diameter portion 38 of the central bore 32. This placing compresses the outer ring portion 52 against the walls of the fixture 16. Thus, the sealing element 30 is initially in a compressed state when inserted into the third diameter portion 38. Also, the sealing element 30 may be placed on the conduit 12, after the retaining element 14 is in position, then inserting the conduit 12 into port 18 until retaining element 14 is secured in the central bore 32. This action compresses the outer ring portion 52 against the walls of the fixture 16, thus, effectuating a seal. The sealing element 30 is secured in the third diameter portion 38 by the retaining element 14.

The temperature of automotive components change from very cold temperatures to very hot temperatures over a relatively short period of time. Many of these components are manufactured from different materials and thus many different thermal expansion rates are present. Therefore, not all components will be expanding and contracting at the same rate of speed. The present invention provides for the sealing of components having varying rates of expansion and contraction. If, for example, the fixture 16 is manufactured from aluminum, cast iron, stainless steel or the like, and the sealing element 30 is manufactured from spring steel, they will expand at different rates. Also, since the sealing element 30 is initially compressed, this might have an effect on the expansion and contraction rate of the sealing element 30. Thus, as the sealing element 30, fixture 16, retainer 14, and conduit 12 expand at different rates due to the increase in temperature, the inner and outer ring portions 50, 52 of the sealing element 30 expand to maintain a seal in the central bore 32 minimizing fluid leakage.

The fixture 16, along with being an automotive engine, exhaust manifold, muffler, catalytic converter, exhaust pipes or the like, may also be a housing, as described in Ser. No. 360,201 further incorporated by reference. The fixture 16 may also have apertures (not shown), as described in Ser. No. 360,201 further incorporated by reference, for trapping the retaining element 14 in the central bore 32.

The plurality of retainer element arms 26 project from a central base 27. The plurality of arms 16 and central base 27 are of a one-piece construction. The central base 27, preferably a collar, has a circular shape having a central aperture 56 having a diameter approximately equal to that of the inner ring portion 50 of the sealing element 30. The arms 26 are circumferentially spaced around the central base 27, preferably equally, and are radially outwardly extending therefrom. The undeflected arms 26 extend generally symmetrically from their securements to the central base 27 at a double included angle of between 50° to 75° and preferably about 65 relative to the central axis 24. In one embodiment of the present invention, the base 27 is secured to the sealing means 30 by suitable means, such as spot welds 54. This reduces the number of separate components to the connector assembly which have to be kept track of and assembled, while not adversely affecting the seal between the conduit 12 and the fixture 16. In this embodiment, the spot welds are formed only along the generally flat wall portion 51 of the seal element which connect the inner and outer ring portions.

The plurality of arms 26 have a securing portion 58, adjacent to the base 27, for locking the annular surface 20 of the conduit 12 into the retaining element 14. The securing portion 58 has an inwardly opening recess 59, generally complementary shaped to conduit bead 20, for nestingly receiving the conduit 12 into the securing portion 58 of the retaining element 14. The plurality of arms 26 each have a fixture engaging portion 60 which is formed to provide an outwardly opening channel towards the free extending end of the arms 26. The channel 61 is interposed between the securing portion 58 and flanged stop portion 28 and is used for securing the retaining element 14 in the central bore 32 of fixture 16 by trapping the fixture engaging portion 60 of the retaining element 14 in the enlarged diameter portion 36 of the central bore 32. The plurality of arms 16 are also formed with an outwardly extending flanged stop portion 28 positioned on the free depending end of the arms 26. The stop portions 28 are employed to prevent further inward movement of the retaining means 14 into the central bore 32 of the fixture 16 after the fixture engaging portion 60 has secured the retaining element 14 in the central bore 32.

The arms 26 are compressed for easy connection and disconnection. The arms 26 are squeezed towards the central axis 24 and the retainer 14 and conduit 12 are inserted into the fixture 16. This provides for the fixture engaging portions 60 to clear the first diameter portion 34 of the fixture 16 and to become trapped in the enlarged diameter portion 36 of the fixture 16 when the arms 26 are relaxed. Those in the field will appreciate the ease of connection and disconnection of the present invention even after extended periods of service.

Figure 3:
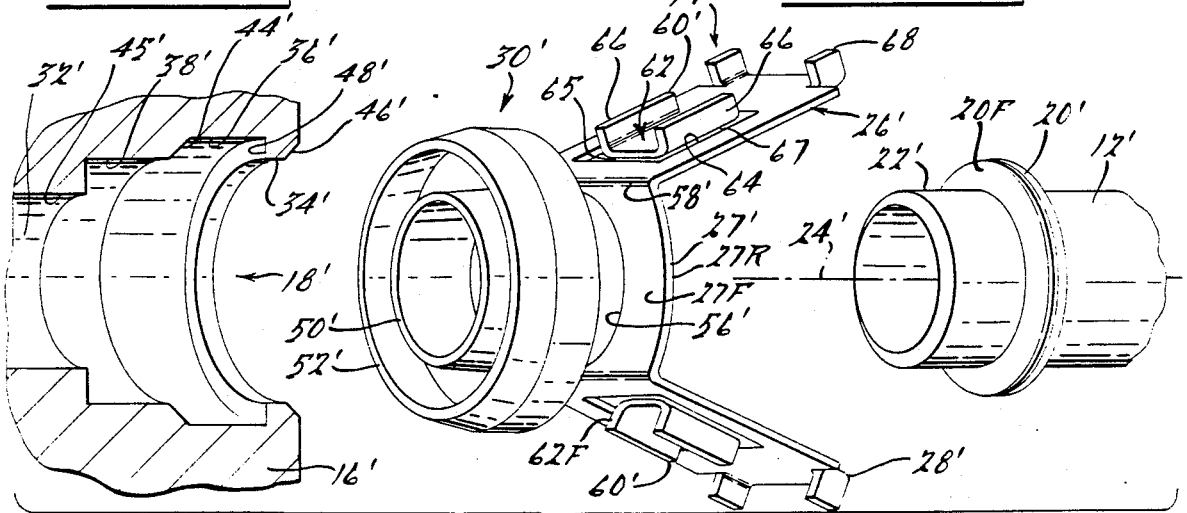
FIG. 3 is a perspective view of a second embodiment of a connector assembly according to the present invention.

Referring to FIGS. 3 and 4, shown is a second embodiment of a connector assembly featuring a modified retainer element 14'. Retaining element 14' is similar to retaining element 14, and reference numerals for the corresponding components are primed. As in the case of retaining element 14, retaining element 14' is an integral element, formed from a resilient metallic material, such as spring steel. The difference between these retainers resides in the trapping of the conduit 12' in the retaining element 14' and the trapping of the retaining element 14' in the central bore 32'.

The retaining element 14' is stamped and formed from a flat sheet of metal and comprises a flat base 27' having a central opening 56' sized to receive the forward end portion 22' of the conduit 12' and a pair of arms 26' each extending rearwardly and outwardly from the base each arm having rearward flange or stop portions 28'. A U-shaped opening or recess is provided in each arm and includes a first portion 64 defining the base of the "U" and a pair of second portions 65 defining the legs of the "U" the first portion 64 of the U-shaped recess having a lateral width substantially the same as the axial width of the annular flange 20'. The U-shaped opening defines a latch element 62 the rearward end of which is secured to the arm 26' such that a forward end 62F thereof is adapted to resiliently spring inward and outward relative to the arm.

The forward end 22' of the conduit 12' is inserted through the opening 56' in retaining element 14' whereby the annular flange 20' engages and deflects the latch 62 radially upward. As the annular flange 20' passes into the recess portion 64 the forward face 20F of flange 20' abuts rearward face 27R of base 27' simultaneously with the latch 62 springing back whereby the forward face 62F thereof engages the rearward face 20R of flange 20'. A pair of fingers 66 project upwardly from the latch 62 each including a forward end 62F adapted to engage the flange 20' and a rearward end 60' defining a fixture engaging portion. The fingers 66 are trapped in the enlarged diameter portion 36' of the central bore 32' securing the retaining element 14' in the central bore 32' of the fixture 16'. Retaining fingers 68 project outwardly from the flanged stop portions 28' the free end of the arms 26' to prevent the retaining element 14' from further inward movement into the central bore 32'.

FIG. 5 illustrates a diagrammatic view of an automobile exhaust emission system showing several different uses of the present invention. The connector assembly 10 can be used to connect the exhaust. manifold 110 to the engine block 112. The connector assembly 10 can also be used to connect the conduit 12 to the exhaust manifold 110. The connector assembly 10 can also be utilized to connect the conduit 12 to other automotive elements such as a catalytic converter 113 and a muffler 116. Also, as explained herein, a housing coupling 118 can be used to connect two different conduits 12 together. The coupling 118 has a plurality of apertures 120, as explained herein, for trapping the retainer arms in the housing coupling 118. The principles of FIG. 14 of Ser. No. 360,201 further incorporated by reference, equally apply to coupling 118; however, it wll be apparent that the present coupling has the properties required for high-temperature low-pressure fluid flow. Thus, the swivelable quick connect assembly 10 can be utilized throughout an automotive exhaust emission system.

While it will be apparent that the preferred embodiments as illustrated herein are well calculated to fill the objects of the above stated, it will also be appreciated that the present invention is susceptible to modification and variation without changing from the scope and spirit of the present invention.

What is claimed is:

1. A high-temperature connector assembly for providing swivelable quick connection capable of transferring a high-temperature fluid, comprising:

a metallic tubular conduit adapted to convey a high-temperature fluid having outwardly projecting annular surface means formed at a predetermined distance from an end of said conduit to be connected for providing a blocking wall portion disposed transversely to the central axis of said conduit, metallic fixture means having an axial bore means formed therein for receiving said conduit at a first port, said axial bore providing a fluid path through said fixture means for said high-temperature fluid, metallic sealing means disposed in said axial bore, said sealing means including a pair of substantially concentric walls, said walls being radially resilient and thermally responsive to said fluid passing through said conduit and said fixture means for radially adjusting to dimensional changes in the conduit and fixture due to thermal expansion or contraction therein and for providing a 360° fluid-tight seal between one of said walls and said conduit and between the other of said walls and said fixture means, and retaining means demountably coupled to said first port of said fixture, said retaining means including a substantially planar annular disk member having a first and second surface and one or more arm members extending from said annular member, said annular member having said first surface adapted to abut and position said metallic seal means in said axial bore and said second surface adapted to abut said outwardly projecting annular surface means, said end of said conduit adapted to pass through said annular disk member and said metallic sealing means into said axial bore of said fixture to convey high-temperature fluid between said conduit and said fixture, said one or more arm members including means for retaining said outwardly projecting annular surface means in said one or more arm members and said one or more arm members including a means for cooperating with said fixture axial bore to resist the disconnection of said conduit from said fixture.

2. The connector assembly according to claim 1 wherein said bore means provides a first diameter portion at said port of said device for receiving said conduit and retaining means in said device.

3. The connector assembly according to claim 2 wherein said bore means provides an enlarged second diameter portion adjacent to said first diameter portion for securing said retainer means.

4. The connector assembly according to claim 3 wherein said bore means provides a third diameter portion adjacent to said second diameter portion having a magnitude less than said first diameter portion.

5. The connector assembly according to claim 4 wherein said metallic sealing means is disposed in said third diameter portion of said bore.

6. The connector assembly according to claim 5 wherein said metallic sealing means has an outer diameter portion approximately larger than said third diameter portion of said bore means and an inner diameter portion which is suitably smaller than the outside diameter of said conduit, so that a fluid tight seal is provided between said conduit and said fixture.

7. The connector assembly according to claim 6 wherein said metallic sealing means comprises an annular cup-shaped member including concentrically disposed cylindrical inner and outer walls and an annular web interconnecting the walls, the outer wall engaging the bore, the inner wall engaging the conduit, and the web engaging the retaining means.

8. A connector assembly according to claim 1 wherein said arms having an inwardly opening channel portion for receiving said annular surface means of said conduit.

9. A connector assembly according to claim 1 wherein said arms having an outwardly opening channel portion for securing the retaining means in said bore.

10. A connector assembly according to claim 9 wherein said retaining means is secured to said sealing means.

11. A connector assembly according to claim 1 wherein said arms having a recess for receiving said annular surface means of said conduit.

12. A connector assembly according to claim 11 wherein said recess is suitably large to receive said annular surface means of said conduit.

13. A connector assembly according to claim 12 wherein said recess is U-shaped.

14. A connector assembly according to claim 13 wherein said arms have a latch means for securing the retaining means in said bore.

15. A connector assembly according to claim 14 wherein said latch has a plurality of outwardly projecting fingers for securing the retaining means in said bore.

16. A connector assembly according to claim 14 wherein said latch means is positioned in the U-shaped recess.

17. A high-temperature connector assembly for a vehicular emissions exhaust system comprising:
an engine exhaust port which is formed having an axial bore for providing a fluid path through said engine, said bore having a first diameter portion, an enlarged second diameter portion adjacent to the first diameter portion, and a third diameter portion adjacent to the second diameter portion having a magnitude less than the first diameter portion;
a tubular conduit adapted to convey fluid having outwardly projecting annular surface means formed at a predetermined distance from an end of said conduit to be connected for providing a blocking wall portion disposed transversely to a central axis of said conduit;
metallic sealing means disposed in said bore means, said sealing means including a pair of substantially concentric walls, said walls being responsive to fluid passing through said conduit and said engine for providing a seal between one of said walls and said conduit and between the other of said walls and said engine exhaust port; and
retaining means demountably coupled to said first port of said engine for cooperating with said blocking wall portion of said annular surface means to resist the disconnection of said conduit from said engine exhaust port and for abutting and positioning said sealing means within said engine exhaust port, said retaining means including a substantially planar annular disk member having a first and second surface and one or more arm members extending from said annular member, said annular member having said first surface adapted to abut and position said metallic seal means in said axial bore and said second surface adapted to abut said outwardly projecting annular surface means, said end of said conduit adapted to pass through said annular disk member and said metallic sealing means into said third diameter portion of said axial bore of said exhaust port to convey fluid between said conduit and said engine, said one or more arm members including means for retaining said outwardly projecting annular surface means in said one or more arm members and said one or more arm members including a means for cooperating with said exhaust port second diameter portion to resist the disconnection of said conduit from said fixture.

18. The high-temperature connector assembly for a vehicular emission exhaust system according to claim 17 wherein said metallic sealing means has an outer diameter portion which is suitably larger than said third diameter portion of said bore means and an inner diameter portion which is suitably smaller than the outside diameter of said conduit, so that a fluid tight seal is provided between said conduit and said engine.

19. The high-temperature connector assembly for a vehicular emission exhaust system according to claim 18 wherein said metallic sealing means is a metallic cup seal.

20. A high-temperature connnector assembly for providing swivelable quick connection capable of transferring a high-temperature fluid, comprising:
a metallic tubular conduit adapted to convey a high-temperature fluid and having an outwardly projecting annular shoulder formed at a predetermined distance from the forward end thereof,
a metallic fixture having an axial bore formed therein for receiving said conduit and providing a fluid path for passing said high-temperature fluid,
a thermally responsive, resilient metallic seal means disposed in said axial bore and primarily adapted to undergo radial changes in shape for engaging and providing a 360° fluid-tight seal and thermal path between and around said conduit and said fixture, said seal means, fixture and conduit being responsive to changes in temperature caused by the fluid such that each may undergo a different expansion or contraction due to the change in temperature while the seal means retains its fluid-tight seal, and releasable retaining means connected to said annular shoulder for abutting and positioning said seal means in said fixture and for resisting the unwanted withdrawal of said conduit from said fixture, said retaining means including a substantially planar annular disk member having a first and second surface and one or more arm members extending from said annular member, said annular member having said first surface adapted to abut and position said metallic seal means in said axial bore and said second surface adapted to abut said outwardly projecting annular shoulder, said end of said conduit adapted to pass through said annular disk member and said metallic sealing means into said axial bore of said fixture to convey high-temperature fluid between said conduit and said fixture, said one or more arm members including means for retaining said outwardly projecting annular shoulder in said one or more arm members and said one or more arm members including a means for cooperating with said fixture axial bore to resist the disconnection of said conduit from said fixture.

21. The connector assembly according to claim 20 wherein said metallic seal means is annular and formed by a pair of concentric cylindrical walls interconected by a transverse wall whereby to form a U-shaped cross-section with the outer and inner walls, respectively, compressingly contact the fixture and the conduit whereby said seal means radially expands or contracts due to temperature changes.

* * * * *